E. G. BAILEY.
PRESSURE RELATION GAGE.
APPLICATION FILED MAR. 21, 1911. RENEWED AUG. 24, 1917.
1,257,963.
Patented Mar. 5, 1918.
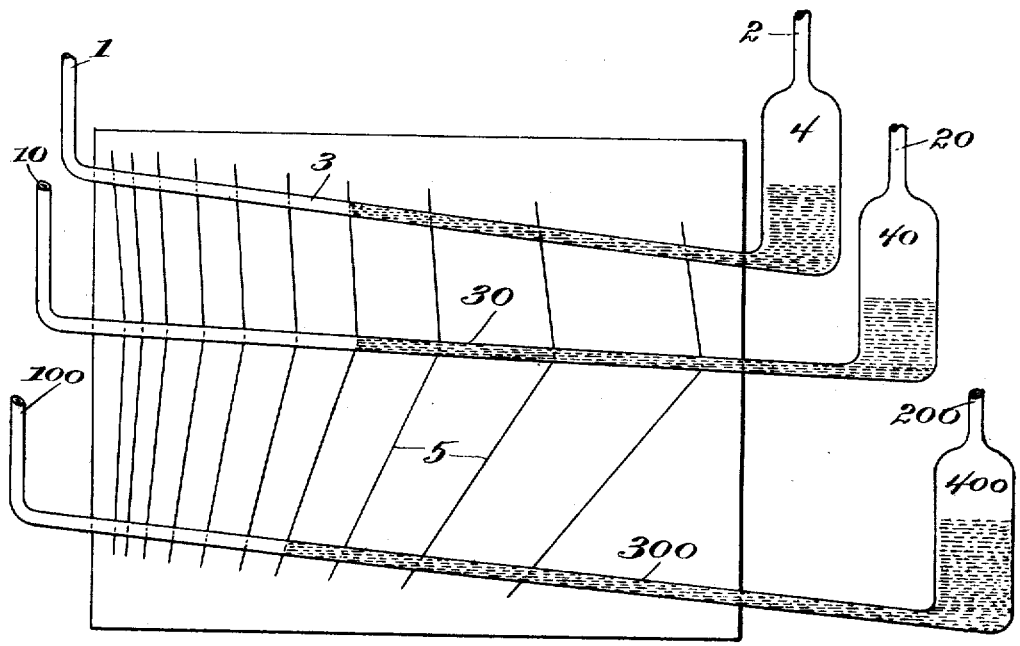

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

PRESSURE-RELATION GAGE.

1,257,963.  Specification of Letters Patent.  Patented Mar. 5, 1918.

Application filed March 21, 1911, Serial No. 616,020. Renewed August 24, 1917. Serial No. 188,067.

*To all whom it may concern:*

Be it known that I, ERVIN G. BAILEY, a citizen of the United States, residing in Newton Highlands, in the county of Middlesex and State of Massachusetts, have invented an Improvement in Pressure-Relation Gages, of which the following description, in connection with the accompanying drawings, is a specification, like letters on the drawings representing like parts.

The present invention relates to a pressure relation gage, and is embodied in an instrument adapted to indicate whether or not a certain definite relation exists other than a ratio of one to one between two or more variable pressures, regardless of the intensities of the pressures themselves.

While the general construction and arrangement of the instrument embodying this invention are susceptible of various modifications, the principle involved is the same throughout, the operation of the instrument depending on a suitable combination and adjustment of two or more separate pressure-actuated gages, so that the readings of the gages will be the same either in actual magnitude or in comparison with graduations on a scale common to all the gages, when the pressures applied to the various parts of the instrument bear the desired relation to each other.

While it is true that pressure gages of any suitable or usual construction may be used independently to indicate the pressures or differences of pressure in various parts of a conduit or passage, the time and trouble involved in calculating from such independent readings, the relation which exists between various pressures are such as to render such a procedure practically useless in obtaining the desired information. The instrument embodying this invention, however, is provided with means, correlating two or more pressure gages so that they show the same reading when a desired relation exists between the operating pressures and when the pressures are not equal, whereby the observer can at all times see, by merely observing the readings of the instrument, whether or not the desired relation exists between the various pressures applied thereto. The instrument also indicates in what manner and to what extent a change, if any, has taken place in the relation between the pressures or pressure differences for which the instrument has been set.

Figure 1 is a perspective view of an instrument having a plurality of reading tubes containing liquid subjected to pressure and a scale common to all; Fig. 2 is a front elevation of a similar instrument having a different arrangement of the reading tubes and scale; and Fig. 3 is a sectional diagram view of a further modification in which a pressure actuated pointer traveling over a scale is utilized as the equivalent of a reading tube.

Referring to Fig. 1, the instrument is shown as provided with three ordinary U-tube pressure gages 1, 2 and 3 which are mounted in guide grooves 4 and 5, the reading leg of each U-tube being in front of a convergingly graduated scale 6. Pressures are communicated to the U-tube 1 which contains a liquid, through pipes 7 and 8 connected, respectively with the legs 9 and 10, the reading leg 9 being located in front of the graduations 6. The U-tubes 2 and 3 are of similar construction, and the reading legs of said tubes are located in front of the converging graduations 6, so that when the level of the liquid in each is even with or proportionally distant from any one line of the scale, it indicates that a certain relation exists between the differences of pressure communicated to the tubes through the pipes 7, 8, 12, 13, 14 and 15.

As an illustration of the practical application of this gage, its use in connection with a gas fired boiler furnace will assist in explaining the invention. In such a furnace it is desirable to supply more or less gas to the furnace in proportion to the amount of steam generated. It is also desirable to supply air to the furnace in proportion to the amount of gas supplied. In order that the attendant may know how to regulate the system in such a way as to maintain these desirable conditions, it is necessary to provide him with means whereby he may observe at all times the conditions which actually exist, so that he may be informed when a departure from the desired conditions has taken place, and may also be informed as to the nature and extent of the departure.

The instrument embodying this invention is a tell-tale of the departure, if any, from the desired conditions, and is also an indicator of the nature and extent thereof. In the construction shown in Fig. 1, Pitot tubes, or equivalent devices are placed in the conduits through which the fluids under observation are flowing, and the dynamic and static pressure nozzles of each Pitot tube are connected, respectively, to pipes 7 and 8, 12 and 13, and 14 and 15. If, for example, considering the areas of the pipes or conduits, the density of fluids, or other elements affecting the result, it has been learned by comparative tests, or other means, that for any given velocity head in the pipe conveying the steam from the boiler, the velocity head of the gas flowing to the furnace should be 70% of the velocity head in the said steam conveying pipe, the tube 2 should be so placed with respect to the convergingly graduated scale, and to the tube 1, that the difference between the pressure communicated through the pipe 12 and the pressure communicated through the pipe 13 will be 70% of the difference between the pressure communicated through the pipe 7 and the pressure communicated through the pipe 8 when the surfaces of the liquids in the two tubes are coincident with, or proportionally distant from any one line of the graduations, regardless of the part of the scale where the readings are taken. It may also be assumed that, in a similar way, it has been learned what relation should exist between the velocity head in the air passage and the velocity head in the gas passage. Accordingly, the reading leg of the U-tube 3 should be so located with respect to the scale 6 and the U-tube 2 that the desired relation will exist when the liquid level in these tubes is coincident with, or proportionally distant from, any one line of the graduated scale. It is obvious that when this instrument is properly constructed, adjusted, and connected to such a furnace, the observer can readily see whether or not the furnace is being supplied with more or less gas than that which is in the desired proportion to the amount of steam being generated, regardless of the rate of generation of steam; and in like manner he can also see whether or not too much or too little air is being supplied to the furnace in proportion to the amount of gas. In practice, it may be desirable to supply proportionally more gas to the furnace for high rates of generation of steam than is necessary for intermediate rates, in order to supply the additional heat required on account of the losses due to higher flue temperature, radiation, or other causes. If this change in relation has been determined, the converging graduations on the scale 6 are not necessarily focused at the point 16, as shown, and each graduation may be drawn at such an angle that the desired relation may be indicated for any rate of steam generation throughout the range desired. In like manner, any other varying proportion due to different rates of flow may be indicated by the level of the liquid in the U-tubes 2 and 3 by properly graduating the scale. This graduated scale constitutes the means correlating the several gages.

The particular advantage of the construction and arrangement above described is that the tubes are readily adjustable with respect to each other, so that if there is a change in the desired relation between the various pressures, an adjustment of the instrument to indicate the desired relation can readily be made. For example, it may be desirable to indicate, in a system where a plurality of boilers are used, whether or not an individual boiler is supplying to the main steam line, the desired proportional amount of steam. In such a case, it is practicable to connect the pipes 7 and 8 to the nozzles of a Pitot tube in the steam pipe leading from an individual boiler; and the level of the liquid in the tube 1 will then vary with the rate of flow of steam through the said steam pipe. The pipes 12 and 13, in this case, are connected to the nozzles of a Pitot tube in the main steam line, and the level of the liquid in the tube 2 will vary with the rate of flow of steam in the main steam line. For any given number of individual boilers in service, the tube 2 may be so located with relation to the convergingly graduated scale, and with relation to the tube 1, that the liquid levels in the tubes 1 and 2 will coincide with, or be proportionally distant from, the same line of the scale, when the individual boiler is supplying its desired quota of steam. This brings about a direct association with a main steam meter responsive to the output of steam from a battery of boilers, of an individual meter responsive to the output from each single boiler, so that at each individual meter the reading thereof can be compared with the reading of the main meter to ascertain whether or not the individual boiler is doing its proper share of the work: and by arranging the scale as above described the information desired is shown at a glance. If, however, a change is made in the number of boilers in service, there will be a corresponding change in the proportional amount of steam which should normally be supplied from the individual boiler under observation. It is, therefore, necessary to make an adjustment of the instrument to meet the changed conditions; and this adjustment can be made by moving the tube 2 horizontally with relation to the scale, so that the liquid levels in the two tubes will coincide with, or be at a proportional distance from, the same scale line when the new desired relation exists between the proportional rate of flow of steam in the two pipes.

Referring to Fig. 2, a modified construction is shown, the instrument illustrated operating on the same principle as that of the instrument shown in Fig. 1, but being provided with a differently arranged system of indicating tubes. In this instrument, the adjustments provided for in the instrument shown in Fig. 1 are dispensed with; but the instrument is useful in cases where frequent changes in the desired relation between the various pressures are not required. The means correlating the several gages is provided for in the size and shape of the reservoirs 17, 20, and 22, which as shown in the drawing are not alike as in ordinary gages, but are purposely made different to bring about a correlation of the readings when the desired relation exists between the operating pressures. This feature, as will be seen, accomplishes exactly the same purpose as is accomplished by the converging graduated scale as shown in Fig. 1.

The instrument illustrated is provided with three modified U-tube pressure gages of the Plecet type. The pressure gage 17, 18 consists of the reservoir 17 connected to the inclined tube 18, and the pipes 170 and 180 connected to the gage, as shown, communicate pressures to the surface of the liquid contained in the reservoir 17 and the liquid contained in the tube 18, respectively. The greater pressure in the tube 180 causes the liquid in the tube 18 to move with respect to the scale 19 which is suitably graduated to denote the difference of pressure measured by the said tube. Gages 20, 21 and 22, 23 are of similar construction.

For illustration, if this instrument were applied to a furnace burning solid fuel which is supplied with both primary and secondary air, it could be determined what is the proper relation existing between the drop in pressure across the fuel bed, the velocity head corresponding to the rate of flow of primary air, and the velocity head corresponding to the rate of flow of secondary air to the furnace. After this relation has been determined, the necessary relation between the areas of the reservoir and inclined tubes of the three parts of the gage, together with the density of liquid to be used in each, can be ascertained, so as to secure the corresponding relation between the indicated readings; and by connecting the pipes 180 and 170, respectively, to the space beneath the fuel bed and to the space above the fuel bed, and the pipes 200 and 210, respectively, to the dynamic and static nozzles of a Pitot tube in the primary air supply duct and the pipes 220 and 230, respectively, to corresponding Pitot tube nozzles in the secondary air supply duct, a condition is brought about whereby the extent of movement of the liquid in the three tubes 18, 21 and 23 will be the same, so long as the desired relation exists between the condition of the fuel bed and the proportional supply of primary and secondary air, regardless of the actual amounts of air, or rates of flow. Conversely, any deviation from this relation will immediately change the level of the liquid in one tube with respect to another, thereby indicating to the observer that a change has taken place, and also indicating what adjustment is necessary to restore the desired conditions.

The example above described is merely used as an illustration, and it is obvious that this instrument can be used for any number of purposes where similar indications are desired.

If, on account of any change in the character of fuel used, it is desirable to change the relation between the various differences of pressure under observation, the necessary change can readily be made by varying the relative pressure receiving areas in the reservoir and the inclined tube of the modified U-tube gage which is connected across the fuel bed, so as to bring about the same indicated reading, although in reality there is another difference of pressure across the fuel bed differing from that which previously existed for the same indicated reading.

In the modified form of instrument shown in Fig. 3, the indicating devices are shown as pointers 24 and 25 which are adapted to travel over a graduated scale 26, these pointers being the equivalent, in the use of the instrument, of the liquid in the reading tubes previously described, and being moved in response to differences in opposed pressures. In the construction shown, the pointer 24 is connected to a diaphragm 27 contained in a closed case 28 which receives the opposed pressures at opposite sides of the diaphragm through pipes 29 and 30, so that the pointer 24 which is pivoted at 31 will be moved over the scale when the diaphragm is moved. The pointer 25 is also pivoted at 31 and similarly connected with a diaphragm 32 in a closed case 33 which receives pressures at opposite sides of the diaphragm through pipes 34 and 35. The diaphragms are so arranged and adjusted that, when the difference between the pressure acting on one side of one diaphragm and that acting on the other side thereof bears a certain definite relation to the difference between the pressures acting, respectively, on opposite sides of the other diaphragm, the two pointers will coincide with each other and with the same graduation on the scale 26, but will not so coincide with the same graduation if the desired relation between the pressure differences has been departed from. So far as relates to the use of the instrument to indicate a departure from the desired relation, it is obvious that the scale may be dispensed with, since, in this connection, either pointer is equivalent to a scale or means of comparison for the other.

From the foregoing description, it is apparent that the specific construction and arrangement of the pressure actuated devices used in obtaining the readings desired may be widely varied or modified without departing from the invention. The position of the pressure actuated indicators relative to each other and to the scale, however, is such in all cases that the said indicators will coincide with each other, or in some way indicate the same reading, so long as the predetermined desired relation between the pressures under observation exists, and will indicate that there is a departure from such relation when they do not so coincide.

This invention has proven particularly useful in connection with the operation of a steam boiler and furnace burning coal or other fuel. The pressure relation gage for this use consists of a differential pressure gage suitably connected to the steam pipe, which gage gives a reading that varies as some function of the rate of generation of steam, combined with another differential pressure gage, suitably connected to the air or gas passageway which gage gives a reading that varies as some function of the rate of air supply to the furnace; and the functional relations between the pressure differences and readings are such in the two cases that both gages indicate the same arbitrary reading when the most efficient rate of air supply exists at all rates of steam generation.

What I claim is:

1. An instrument comprising two or more pressure gages provided with indicators, and means correlating said gages so that said indicators all indicate the same reading when a desired relation other than the ratio of one to one exists between the various pressures, regardless of the actual intensities of the pressures.

2. An instrument consisting of two or more liquid pressure gages, combined with a scale common to said gages, said scale having converging graduations, the gages and the scale being so located with relation to each other that the readings indicated by the levels of the liquid in the several gages will be proportionately distant from the same graduation of the said scale when a certain desired relation other than the ratio of one to one exists between various pressures.

3. A pressure relation gage comprising two or more pressure gages, the indicators of which are associated with a scale having converging graduations; and a support adjacent to the scale on which said pressure gages are movably mounted, whereby such an adjustment of the gage indicators relative to the scale can be made that the indicated readings will be proportionally distant from the same graduation of the scale when any desired predetermined relation exists between the pressures.

4. An instrument comprising two or more pressure gages adapted respectively to be operated by pressures in different parts of an apparatus in which the several pressures are related factors which enter into the operation of the apparatus; and means correlating said gages so that the indicators thereof show the same reading when a certain predetermined relation exists between the pressures, although said pressures differ from each other in their actual intensities.

5. In a pressure-relation gage, the combination with a plurality of liquid-containing U-tube gages, of a support for said gages upon which they are movably mounted; means for communicating pressures to the free surfaces of the liquid in each gage; and a scale located adjacent to the reading legs of said gages and having convergent graduations, the convergence of which is such that the different readings will fall on or proportionally distant from the same graduation when a predetermined relation exists between the different pressures.

In testimony whereof, I have signed my name to this specification in the presence of two subscribing witnesses.

ERVIN G. BAILEY.

Witnesses:
 Jas. J. Maloney,
 M. E. Coveney.